(12) United States Patent
Park et al.

(10) Patent No.: US 7,672,204 B2
(45) Date of Patent: Mar. 2, 2010

(54) OPTICAL DISC, METHOD AND APPARATUS FOR MANAGING A DEFECTIVE AREA ON AN OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 1745 days.

(21) Appl. No.: 10/670,332

(22) Filed: Sep. 26, 2003

(65) Prior Publication Data

US 2004/0158768 A1 Aug. 12, 2004

(30) Foreign Application Priority Data

Jan. 27, 2003 (KR) .................. 10-2003-0005214
Feb. 11, 2003 (KR) .................. 10-2003-0008564

(51) Int. Cl.
*G11B 7/0045* (2006.01)
*G11B 20/10* (2006.01)
*G11B 7/00* (2006.01)

(52) U.S. Cl. .................. 369/47.14; 369/53.17

(58) Field of Classification Search .............. 369/47.14, 369/53.12–53.13, 53.15–53.17, 53.35–53.37, 369/59.25
See application file for complete search history.

(56) References Cited

U.S. PATENT DOCUMENTS

| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,051,849 A | 9/1991 | Fukushima et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—Andrea L Wellington
*Assistant Examiner*—Nathan Danielsen
(74) *Attorney, Agent, or Firm*—Birch, Stewart, Kolasch & Birch, LLP

(57) ABSTRACT

A method and apparatus for managing a defective area on a optical recording medium, e.g., of writable once type, permits more efficient writing and management of defect list information or temporary defect list information for managing the defective area in a minimum recording size. The method includes writing data in a defective area existing on a high density optical disc, e.g., such as a BD-WO, in a spare area in place of the defective area, producing defect list information for access to the data replacement written in the spare area and writing in a particular area for defect management. The defect entries actually corresponding to the replacement written data, and writing location information of the next available spare area are written and managed as defect list information for management, or the writing location information of a location where replacement writing is possible is written and managed as defect definition structure information.

15 Claims, 16 Drawing Sheets

U.S. PATENT DOCUMENTS

| | | | |
|---|---|---|---|
| 5,065,388 A | 11/1991 | Roth et al. | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |
| 5,247,494 A | 9/1993 | Ohno et al. | |
| 5,289,450 A * | 2/1994 | Mizumoto et al. | 369/53.37 |
| 5,319,626 A | 6/1994 | Ozaki et al. | |
| 5,343,456 A * | 8/1994 | Maeda | 369/47.33 |
| 5,404,357 A | 4/1995 | Ito et al. | |
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,555,537 A | 9/1996 | Imaino et al. | |
| 5,577,194 A | 11/1996 | Wells et al. | |
| 5,608,715 A | 3/1997 | Yokogawa et al. | |
| 5,633,764 A | 5/1997 | Ohta | |
| 5,644,539 A | 7/1997 | Yamagami et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,805,547 A | 9/1998 | Yamamuro | |
| 5,825,726 A | 10/1998 | Hwang et al. | |
| 5,848,038 A | 12/1998 | Igarashi et al. | |
| 5,867,455 A | 2/1999 | Miyamoto et al. | |
| 5,878,020 A | 3/1999 | Takahashi | |
| 5,890,206 A | 3/1999 | Koike | |
| 5,914,928 A | 6/1999 | Takahashi et al. | |
| 5,930,815 A | 7/1999 | Estakhri et al. | |
| 5,940,702 A | 8/1999 | Sakao et al. | |
| 5,966,358 A | 10/1999 | Mine | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,182,240 B1 | 1/2001 | Mine | |
| 6,189,118 B1 | 2/2001 | Sasaki et al. | |
| 6,205,099 B1 | 3/2001 | Sasaki et al. | |
| 6,212,647 B1 | 4/2001 | Sims, III et al. | |
| 6,233,654 B1 | 5/2001 | Aoki et al. | |
| 6,249,884 B1 | 6/2001 | Joo | |
| 6,292,445 B1 | 9/2001 | Ito et al. | |
| 6,301,220 B1 | 10/2001 | Takagi et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,418,100 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,243 B2 | 12/2003 | Ando et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| RE38,638 E | 10/2004 | Yonemitsu et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,317,670 B2 * | 1/2008 | Park | 369/53.15 |
| 7,327,654 B2 | 2/2008 | Hwang et al. | |
| 7,349,301 B2 | 3/2008 | Terada et al. | |
| 7,355,934 B2 | 4/2008 | Park et al. | |
| 7,372,788 B2 * | 5/2008 | Park et al. | 369/47.14 |
| 7,372,792 B2 | 5/2008 | Park | |
| 7,379,402 B2 | 5/2008 | Ko et al. | |
| 7,428,670 B2 | 9/2008 | Hwang et al. | |
| 7,483,349 B2 | 1/2009 | Park et al. | |
| 7,483,355 B2 * | 1/2009 | Park | 369/53.15 |
| 7,506,109 B2 | 3/2009 | Park | |
| 2001/0009537 A1 | 7/2001 | Park | |
| 2001/0011267 A1 | 8/2001 | Kihara et al. | |
| 2001/0014070 A1 | 8/2001 | Ando et al. | |
| 2001/0021144 A1 | 9/2001 | Oshima et al. | |
| 2001/0026511 A1 | 10/2001 | Ueda et al. | |
| 2001/0033517 A1 | 10/2001 | Ando et al. | |
| 2001/0043525 A1 | 11/2001 | Ito et al. | |
| 2001/0043800 A1 | 11/2001 | Gotoh et al. | |
| 2002/0025138 A1 | 2/2002 | Isobe et al. | |
| 2002/0049938 A1 | 4/2002 | Ko | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |

| | | | | | |
|---|---|---|---|---|---|
| 2002/0176341 A1 | 11/2002 | Ko et al. | CN | 1246707 A | 3/2000 |
| 2002/0186341 A1 | 12/2002 | Yamamura et al. | CN | 1273419 A | 11/2000 |
| 2003/0072236 A1 | 4/2003 | Hirotsune et al. | CN | 1342314 A | 3/2002 |
| 2003/0095482 A1 | 5/2003 | Hung et al. | CN | 1479304 A | 3/2004 |
| 2003/0126527 A1 | 7/2003 | Kim et al. | CN | 1675708 A | 9/2005 |
| 2003/0135800 A1 | 7/2003 | Kim et al. | CN | 1685426 A | 10/2005 |
| 2003/0137909 A1 | 7/2003 | Ito et al. | DE | 199 54 054 A1 | 6/2000 |
| 2003/0137910 A1 | 7/2003 | Ueda et al. | EA | 0 350 920 A3 | 1/1990 |
| 2003/0137913 A1 | 7/2003 | Oshima et al. | EP | 1 597 722 A0 | 10/1985 |
| 2003/0142608 A1 | 7/2003 | Yamamoto et al. | EP | 0314186 A2 | 5/1989 |
| 2003/0149918 A1 | 8/2003 | Takaichi | EP | 0325823 A1 | 8/1989 |
| 2003/0173669 A1 | 9/2003 | Shau | EP | 0428208 A2 | 5/1991 |
| 2003/0179669 A1* | 9/2003 | Takahashi et al. ........ 369/47.14 | EP | 0464811 A2 | 1/1992 |
| 2003/0198155 A1 | 10/2003 | Go et al. | EP | 0472484 A2 | 2/1992 |
| 2003/0237024 A1 | 12/2003 | Ogawa et al. | EP | 0477503 A2 | 4/1992 |
| 2004/0001408 A1 | 1/2004 | Propps et al. | EP | 05556046 A1 | 8/1993 |
| 2004/0004917 A1 | 1/2004 | Lee | EP | 0871172 A2 | 10/1998 |
| 2004/0022171 A1 | 2/2004 | Ko | EP | 0908882 A2 | 4/1999 |
| 2004/0062159 A1 | 4/2004 | Park et al. | EP | 0971345 A1 | 1/2000 |
| 2004/0062160 A1 | 4/2004 | Park et al. | EP | 0974967 A1 | 1/2000 |
| 2004/0076096 A1 | 4/2004 | Hwang et al. | EP | 0 984 455 A1 | 3/2000 |
| 2004/0090888 A1 | 5/2004 | Park et al. | EP | 0989554 A1 | 3/2000 |
| 2004/0105363 A1 | 6/2004 | Ko et al. | EP | 0997904 A1 | 5/2000 |
| 2004/0114474 A1 | 6/2004 | Park et al. | EP | 1026681 B1 | 8/2000 |
| 2004/0120233 A1 | 6/2004 | Park et al. | EP | 1040937 A1 | 10/2000 |
| 2004/0125716 A1 | 7/2004 | Ko et al. | EP | 1043723 A1 | 10/2000 |
| 2004/0125717 A1 | 7/2004 | Ko et al. | EP | 1132914 A2 | 9/2001 |
| 2004/0136292 A1 | 7/2004 | Park et al. | EP | 1 143 444 A2 | 10/2001 |
| 2004/0145980 A1 | 7/2004 | Park et al. | EP | 1 148 493 A2 | 10/2001 |
| 2004/0158768 A1 | 8/2004 | Park et al. | EP | 1152414 A2 | 11/2001 |
| 2004/0160799 A1 | 8/2004 | Park et al. | EP | 1239748 A1 | 9/2002 |
| 2004/0165495 A1 | 8/2004 | Park et al. | EP | 1 274 081 A2 | 1/2003 |
| 2004/0174782 A1 | 9/2004 | Lee et al. | EP | 1298659 A1 | 4/2003 |
| 2004/0174785 A1 | 9/2004 | Ueda et al. | EP | 1321940 A1 | 6/2003 |
| 2004/0179445 A1 | 9/2004 | Park et al. | EP | 1329888 A1 | 7/2003 |
| 2004/0179458 A1 | 9/2004 | Hwang et al. | EP | 1347452 A2 | 9/2003 |
| 2004/0190406 A1 | 9/2004 | Hwang et al. | EP | 1 547 066 A0 | 6/2005 |
| 2004/0193946 A1 | 9/2004 | Park et al. | EP | 1547065 A0 | 6/2005 |
| 2004/0223427 A1 | 11/2004 | Kim et al. | EP | 1 552 510 A1 | 7/2005 |
| 2004/0246849 A1 | 12/2004 | Hwang et al. | EP | 1564740 A1 | 8/2005 |
| 2004/0246851 A1 | 12/2004 | Hwang et al. | EP | 1 576 603 A0 | 9/2005 |
| 2004/0246852 A1 | 12/2004 | Hwang et al. | EP | 1573723 A0 | 9/2005 |
| 2005/0007910 A1 | 1/2005 | Ito et al. | EP | 1612790 A1 | 1/2006 |
| 2005/0008346 A1 | 1/2005 | Noguchi et al. | EP | 1623422 A0 | 2/2006 |
| 2005/0025007 A1 | 2/2005 | Park | GB | 2356735 A | 5/2001 |
| 2005/0047294 A1 | 3/2005 | Park | JP | 63-091842 A | 4/1988 |
| 2005/0050402 A1 | 3/2005 | Koda et al. | JP | 64-79940 A | 3/1989 |
| 2005/0052972 A1 | 3/2005 | Park | JP | 01-263955 A | 10/1989 |
| 2005/0052973 A1 | 3/2005 | Park | JP | 02-023417 A | 1/1990 |
| 2005/0055500 A1 | 3/2005 | Park | JP | 2-23417 A | 1/1990 |
| 2005/0060489 A1 | 3/2005 | Park | JP | 02-054327 A | 2/1990 |
| 2005/0068877 A1 | 3/2005 | Yeo | JP | 2-152072 A | 6/1990 |
| 2005/0083740 A1 | 4/2005 | Kobayashi | JP | 4-114371 A | 4/1992 |
| 2005/0083767 A1 | 4/2005 | Terada et al. | JP | 4-172662 A | 6/1992 |
| 2005/0083830 A1 | 4/2005 | Martens et al. | JP | 05-274814 A | 10/1993 |
| 2005/0111315 A1 | 5/2005 | Hwang et al. | JP | 6-309802 A | 11/1994 |
| 2005/0195716 A1 | 9/2005 | Ko et al. | JP | 06-338139 | 12/1994 |
| 2005/0207262 A1 | 9/2005 | Terada et al. | JP | 06-349201 A | 12/1994 |
| 2005/0289389 A1 | 12/2005 | Yamagami et al. | JP | 7-29177 A | 1/1995 |
| 2006/0077827 A1 | 4/2006 | Takahashi | JP | 07-121993 A | 5/1995 |
| 2006/0195719 A1 | 8/2006 | Ueda et al. | JP | 7-168749 A | 7/1995 |
| 2006/0203635 A1 | 9/2006 | Ko et al. | JP | 8-50766 A | 2/1996 |
| 2006/0203638 A1 | 9/2006 | Ko et al. | JP | 08-096522 A | 4/1996 |
| 2006/0203684 A1 | 9/2006 | Ko et al. | JP | 8-147702 A | 6/1996 |
| 2006/0227694 A1 | 10/2006 | Woerlee et al. | JP | 8-273162 A | 10/1996 |
| 2006/0233078 A1 | 10/2006 | Terada et al. | JP | 8-287595 A | 11/1996 |
| 2007/0294571 A1 | 12/2007 | Park et al. | JP | 09-145634 A | 6/1997 |
| 2008/0046780 A1 | 2/2008 | Shibuya et al. | JP | 09-231053 A | 9/1997 |
| | | | JP | 9-270175 A | 10/1997 |
| | FOREIGN PATENT DOCUMENTS | | JP | 9-282849 A | 10/1997 |
| CN | 1140897 C | 1/1997 | JP | 09-320204 | 12/1997 |
| CN | 1227950 A | 9/1999 | JP | 10-050005 A | 2/1998 |
| | | | JP | 10-050032 A | 2/1998 |

| | | |
|---|---|---|
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 10-199154 A | 7/1998 |
| JP | 10-261286 A | 9/1998 |
| JP | 11-39801 A | 2/1999 |
| JP | 11-66751 A | 3/1999 |
| JP | 11-86418 A | 3/1999 |
| JP | 11-86436 A | 3/1999 |
| JP | 11-110888 A | 4/1999 |
| JP | 11-134809 | 5/1999 |
| JP | 11-203792 A | 7/1999 |
| JP | 2000-40308 A | 2/2000 |
| JP | 2000-090588 A | 3/2000 |
| JP | 2000-105980 A | 4/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2000-293948 A | 10/2000 |
| JP | 2000-322835 A | 11/2000 |
| JP | 2000/322875 A | 11/2000 |
| JP | 2000-339874 A | 12/2000 |
| JP | 2001-023317 A | 1/2001 |
| JP | 2001-069440 A | 3/2001 |
| JP | 2001-110168 A | 4/2001 |
| JP | 2001-148166 A | 5/2001 |
| JP | 2001-167472 A | 6/2001 |
| JP | 2001-266464 A | 9/2001 |
| JP | 2001-319339 A | 11/2001 |
| JP | 2001-351314 A | 12/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-50131 A | 2/2002 |
| JP | 2002-056619 A | 2/2002 |
| JP | 2002-109834 A | 4/2002 |
| JP | 2002-157832 A | 5/2002 |
| JP | 2002-170342 A | 6/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-30844 A | 1/2003 |
| JP | 2003-505813 A | 2/2003 |
| JP | 2003-151216 A1 | 5/2003 |
| JP | 2003-228962 A | 8/2003 |
| JP | 2003-335062 A | 11/2003 |
| JP | 2003-536194 A | 12/2003 |
| JP | 2004-95057 A | 3/2004 |
| JP | 2004-171714 | 6/2004 |
| JP | 2004-213774 A | 7/2004 |
| JP | 2004-280864 A | 10/2004 |
| JP | 2004-280865 A | 10/2004 |
| JP | 2004-280866 | 10/2004 |
| JP | 2004-303381 | 10/2004 |
| JP | 2005-56542 A | 3/2005 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-500724 A | 1/2006 |
| JP | 2006-503396 A | 1/2006 |
| JP | 2006-518533 A | 8/2006 |
| JP | 2006-519445 A | 8/2006 |
| JP | 2007-501488 A | 1/2007 |
| JP | 2008-112577 A | 5/2008 |
| KR | 1020040094301 A | 11/2004 |
| RU | 2174716 C2 | 10/1999 |
| RU | 2192673 C2 | 11/2002 |
| RU | 2 208 844 C2 | 7/2003 |
| RU | 2223556 | 2/2004 |
| RU | 2005 103 626 | 9/2005 |
| RU | 2005 127 337 | 2/2006 |
| RU | 2 337 416 C2 | 10/2008 |
| TW | 283232 A | 8/1996 |
| TW | 302475 A | 4/1997 |
| TW | 371752 | 10/1999 |
| TW | 413805 | 12/2000 |
| TW | 495750 B | 7/2002 |
| WO | WO-84/00628 A1 | 2/1984 |
| WO | WO-96/30902 A1 | 10/1996 |
| WO | WO-97/22182 A1 | 6/1997 |
| WO | WO-97-36296 | 10/1997 |
| WO | WO-00/07185 A1 | 2/2000 |
| WO | WO-00/54274 A1 | 9/2000 |
| WO | WO-01/06512 A1 | 1/2001 |
| WO | WO-01/22416 A1 | 3/2001 |
| WO | WO-01-24179 | 4/2001 |
| WO | WO-01/35408 A1 | 5/2001 |
| WO | WO-01/75879 A1 | 10/2001 |
| WO | WO-01/93035 A2 | 12/2001 |
| WO | WO-01/95330 A2 | 12/2001 |
| WO | WO-02-086888 | 10/2002 |
| WO | WO-03/007296 A1 | 1/2003 |
| WO | WO-03/025924 A1 | 3/2003 |
| WO | WO-03/030173 A2 | 4/2003 |
| WO | WO-03/063165 A1 | 7/2003 |
| WO | WO-03/079353 A1 | 9/2003 |
| WO | WO-2004/015707 A1 | 2/2004 |
| WO | WO-2004/015708 A | 2/2004 |
| WO | WO-2004/025648 A1 | 3/2004 |
| WO | WO-2004025648 | 3/2004 |
| WO | WO-2004025649 | 3/2004 |
| WO | WO-2004/029668 A2 | 4/2004 |
| WO | WO-2004/029941 A1 | 4/2004 |
| WO | WO-2004-029942 | 4/2004 |
| WO | WO-2004/029942 A1 | 4/2004 |
| WO | WO-2004/029968 A2 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/059648 A2 | 7/2004 |
| WO | WO-2004/068476 A1 | 8/2004 |
| WO | WO-2004/075780 A1 | 9/2004 |
| WO | WO-2004/077415 A1 | 9/2004 |
| WO | WO-2004/079729 A1 | 9/2004 |
| WO | WO-2004/079731 A1 | 9/2004 |
| WO | WO-2004/079740 A1 | 9/2004 |
| WO | WO-2004/081922 A1 | 9/2004 |
| WO | WO-2004/081926 A1 | 9/2004 |
| WO | WO-2004079631 | 9/2004 |
| WO | WO-2004-086379 | 10/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |
| WO | WO-2005/024792 A2 | 3/2005 |
| WO | WO-2005/062306 A1 | 7/2005 |
| WO | WO-2005/073971 A2 | 8/2005 |

OTHER PUBLICATIONS

Yokozeki et al., "A Virtual Optical Disk Method to Realize Rewritability and Revision Control on a Write-Once Optical Disk", Systems and Computers in Japan, vol. 21, No. 8, (1990) XP000177819.

* cited by examiner

*Related Art*

*Related Art*

Single Layer BD-WO

Dual Layer BD-WO

US 7,672,204 B2

OPTICAL DISC, METHOD AND APPARATUS FOR MANAGING A DEFECTIVE AREA ON AN OPTICAL DISC

This application claims the benefit of Korean Application Nos. P2003-008564 filed on Feb. 11, 2003, and P2003-005214 filed on Jan. 27, 2003, the entirety of each of which are hereby incorporated by reference.

BACKGROUND OF THE INVENTION

1. Field of the Invention

The present invention relates to a method for managing a defective area on a high density optical disc, and more particularly to a write once optical disc, an apparatus and a method for managing a defective area on a high density optical disc such as a Blu-ray Disc Write Once (BD-WO).

2. Background of the Related Art

A new high density optical disc, on which high quality video, and audio data can be written, erased and rewritten for long periods of time, e.g., a Blu-ray Disc re-writable (BD-RE), is currently being developed.

As seen in FIG. 1, an optical disc device for writing and reproducing data to and from the BD-RE is provided with an optical pickup 11 for writing and reproducing a signal to and from an optical disc 10. A video disc recorder (VDR) system 12 for processing a signal from the optical pickup 11 as a reproduced signal, or demodulating and processing an external data stream into a writable signal suitable for writing is also shown. An encoder 13 for encoding, and providing an external analog signal to the VDR system 12 is also provided in the optical disc device.

As seen in FIG. 2, the BD-RE is divided into, and assigned a lead-in area (LIA), a data area, and a lead-out area (LOA). The data area is provided with a user data area, and an inner spare area (ISA) and an outer spare area (OSA) assigned to a fore end and a rear end of the user data area, respectively. The LIA is provided with a defect management area (DMA) having disc definition structure (DDS) information and a defect list (DFL) information for managing a defective area.

In the meantime, the VDR system 12 of the optical disc device writes the external data in clusters corresponding to an ECC Block unit having a predetermined recording size after encoding and demodulating the external signal into a signal suitable for writing. As shown in FIG. 2, if a defective area is found in the user data area when the data is being written in the user data area, the VDR system 12 carries out a series of replacement writing operations in which the clusters of data written on the defective area are written on one of the spare areas, e.g., on the inner spare area (ISA) in place of the defective area.

The VDR system 12 also writes and manages the defect list information for accessing the data written in the spare area during replacement writing operations. The defect list information has a predetermined recording size, e.g., a fixed recording size of four clusters, and includes a plurality of defect entries (Defect_Entry #1~#n) each with written location information about the respective defective area, and written location information about the data written in the spare area during replacement.

Therefore, even if there is a defective area in the user data area of the BD-RE, the VDR system 12 can prevent a data writing error in advance by writing the clusters of data written on the defective area on the spare area in place of the detective area, and also reproducing the data from the spare area.

The Blu-ray Disc Write-Once (BD-WO) is another type of high density optical disc that is being developed where a high quality of data can be recorded and reproduced to and from the disc. As the name may suggest, data can be written only once on the BD-WO and is not re-writable on the BD-WO. However, the BD-WO can be read repeatedly. As a result, the BD-WO is useful where the rewritability of data on a recording medium is not desired or essential.

Discussions on the standardization of high density optical discs, e.g., such as BD-WO, have recently been underway. In this regard, a disc structure, a method and an apparatus for managing defective areas of the BD-WO are needed, which accommodate and consider the unique characteristics and intended operations of the BD-WO. Such techniques will render the BD-WO commercially marketable and operationally feasible.

SUMMARY OF THE INVENTION

The present invention achieves one of more of these and other advantages not realized by the related art.

An object of the present invention is to provide a method for managing a defective area on an optical recording medium in which defect list information, or temporary defect list information for managing a defective area of a high density optical disc, such as a BD-WO, is written and managed more effectively and efficiently. For example, the method of the present is directed at reducing unnecessary loss of data recording capacity due to the defect list information or the temporary defect information.

One or more of these and other aspects of the invention are accomplished by a method for managing an optical recording medium having at least one temporary defect management area, and at least one spare area in a data area, the method comprising replacing data written in a defective area by writing the data written in the defective area to the at least one spare area as replacement data if the defective area within the data area is detected; and writing defect management information in the at least one temporary defect management area for access to the data written in the spare area, wherein the defect management information for access to the data written in the spare area is identified by at least one navigation pointer.

One or more of these and other aspects of the invention are accomplished by a method for managing an optical recording medium having at least one temporary defect management area, and at least one spare area in a data area, the method comprising replacing data written in a defective area of the data area in the at least one spare area in place of the defective area as replacement data if the defective area within the data area is detected; and producing defect list information and disc definition structure information in the at least one temporary defect management area for access to the data written in the spare area as replacement data, and managing the defect list information and the disc definition structure information, wherein the defect list information includes defect entries corresponding to the replacement data actually written, and the disc definition structure information includes writing location information of a next available sector of the spare area for replacement writing as at least one navigation pointer.

One or more of these and other aspects of the invention are accomplished by a recording medium comprising at least one spare area within a data area; a temporary defect management area for managing a defective area within the data area; a portion of the at least one spare area capable of storing replacement data, wherein data written in the defective area is replaced by writing the data written in the defective area to the portion of the at least one spare area as the replacement data;

and defect management information in the at least one temporary defect management area for access to the data written in the portion of the at least one spare area, wherein the defect management information for access to the data written in the spare area is identified by at least one navigation pointer.

One or more of these and other aspects of the invention are accomplished by a recording medium comprising at least one spare area in the data area; a temporary defect management area for managing a defective area within the data area; a portion of the at least one spare area capable of storing replacement data, wherein data written in the defective area is replaced by writing the data written in the defective area to the portion of the at least one spare area as the replacement data; and defect list information and disc definition structure information in the temporary defect management area for access to the data written in the portion of the at least one spare area, wherein the defect list information includes defect entries corresponding to the replacement data actually written, and the disc definition structure information includes writing location information of a next available sector of the at least one spare area for replacement writing as at least one navigation pointer.

One or more of these and other aspects of the invention are accomplished by an apparatus for managing an optical recording medium having at least one temporary defect management area, and at least one spare area in a data area, the apparatus comprising a combination of components for replacing data written in a defective area by writing the data written in the defective area to the at least one spare area as replacement data if the defective area within the data area is detected; and for writing defect management information in the at least one temporary defect management area for access to the data written in the spare area, wherein the defect management information for access to the data written in the spare area is identified by at least one navigation pointer.

One or more of these and other aspects of the invention are accomplished by an apparatus for managing an optical recording medium having at least one temporary defect management area, and at least one spare area in a data area, the apparatus comprising a combination of components for replacing data written in a defective area of the data area in the at least one spare area in place of the defective area as replacement data if the defective area within the data area is detected; and for producing defect list information and disc definition structure information in the at least one temporary defect management area for access to the data written in the spare area as replacement data, and managing the defect list information and the disc definition structure information, wherein the defect list information includes defect entries corresponding to the replacement data actually written, and the disc definition structure information includes writing location information of a next available sector of the spare area for replacement writing as at least one navigation pointer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings. Preferred embodiments of the present invention will be described in greater detail hereinafter with reference to FIGS. 3-16, and more particularly with reference to the optical disc recording and reproducing device 20 shown in FIG. 3.

Figure 3:
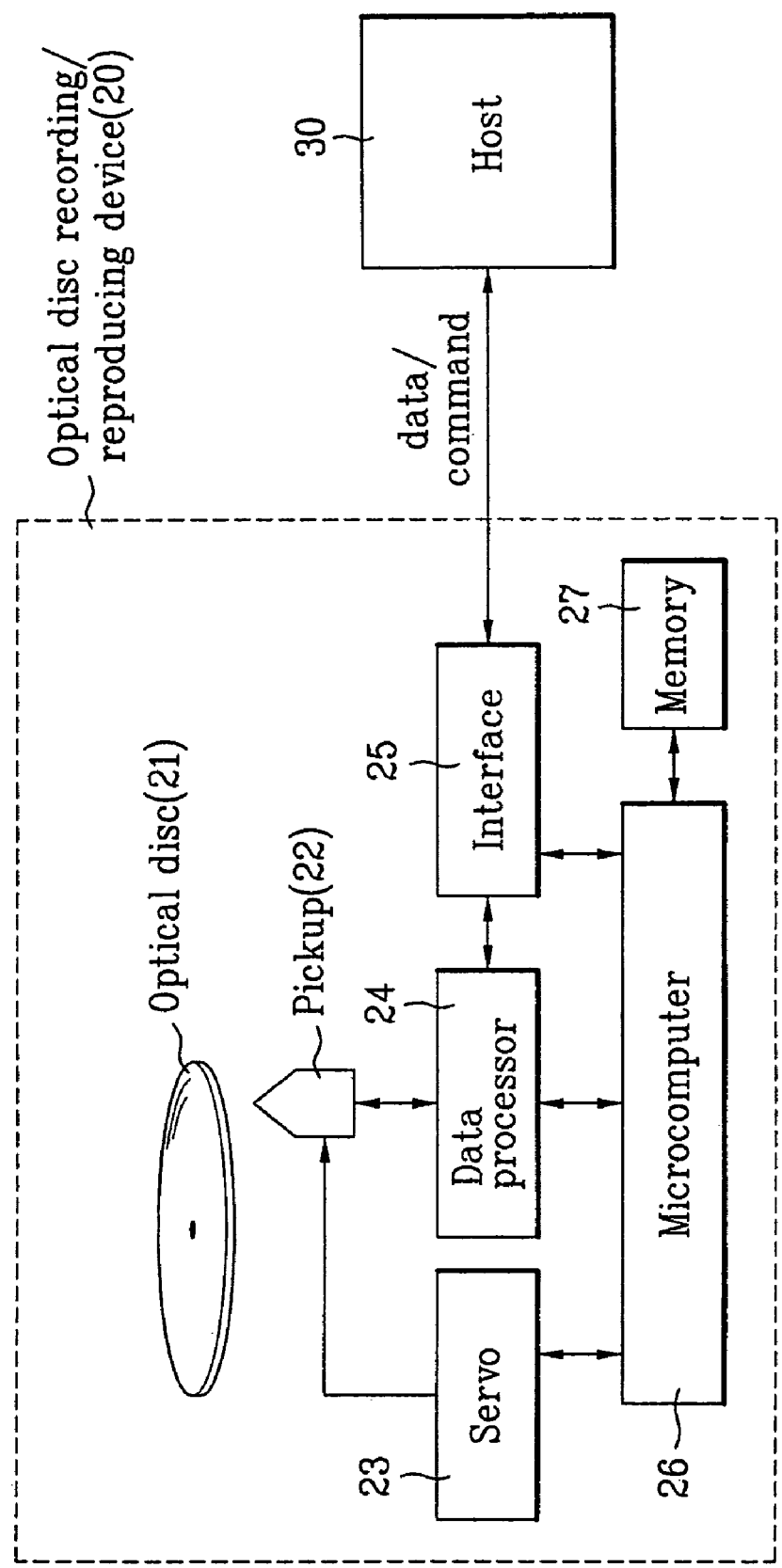
FIG. 3 is a block diagram of an optical disc recording and reproducing device according to an embodiment of the present invention.

FIG. 3 is a block diagram of an optical disc recording and reproducing device 20 according to a preferred embodiment of the present invention. The optical disc recording and/or reproducing device 20 (hereinafter optical disc recording/reproducing device) includes an optical pickup 22 for writing and reading data to and from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data associated with the recording medium 21, and a microprocessor or controller 26 for controlling the operations and elements of the recording/reproducing device 20.

Data to be written or read to or from the recording medium 21 may also be stored in the memory 27. All the components of the recording/reproducing device 20 are operatively coupled. In the exemplary embodiment shown, the recording medium 21 is a recording medium of write-once type, e.g., such as a BD-WO.

Figure 4A:
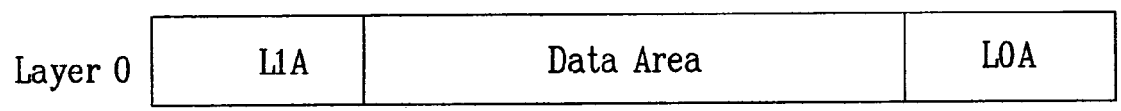
FIGS. 4A and 4B illustrate a structure of a single layer BD-WO and a dual layer BD-WO optical disc, respectively, according to an embodiment of the present invention.
Figure 4B:
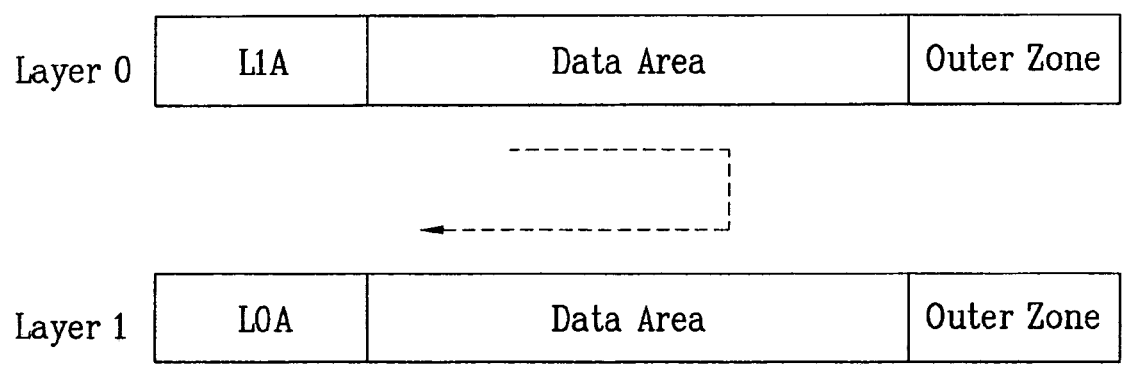

FIGS. 4A and 4B illustrate a structure of a single layer BD-WO and a dual layer BD-WO optical disc, respectively, according to an embodiment of the present invention. As shown in FIGS. 4A and 4B, the BD-WO can have one or two recording layers. In FIG. 4A, a BD-WO having only a single recording layer (Layer 0) includes a single recording layer composed of a lead-in area (LIA), a data area, and a lead-out area (LOA), and is referred to herein as a single layer disc. In FIG. 4B, a dual layer BD-WO includes two recording layers (Layers 0 and 1) and is referred to hereinafter as a dual layer disc. The first recording layer (Layer 0) includes a LIA, a data area, and an outer zone. The second recording layer (Layer 1) includes a LOA, a data area and an outer zone, and is referred to herein as a dual layer disc. Generally, a data writing occurs in the direction shown with the dotted arrow in the dual layer disc. The single layer disc can have a capacity of 23.3, 25.0 or 27.0 Gbytes, whereas the dual layer disc can have a capacity of 46.6, 50.0, or 54.0 Gbytes.

Figure 1:
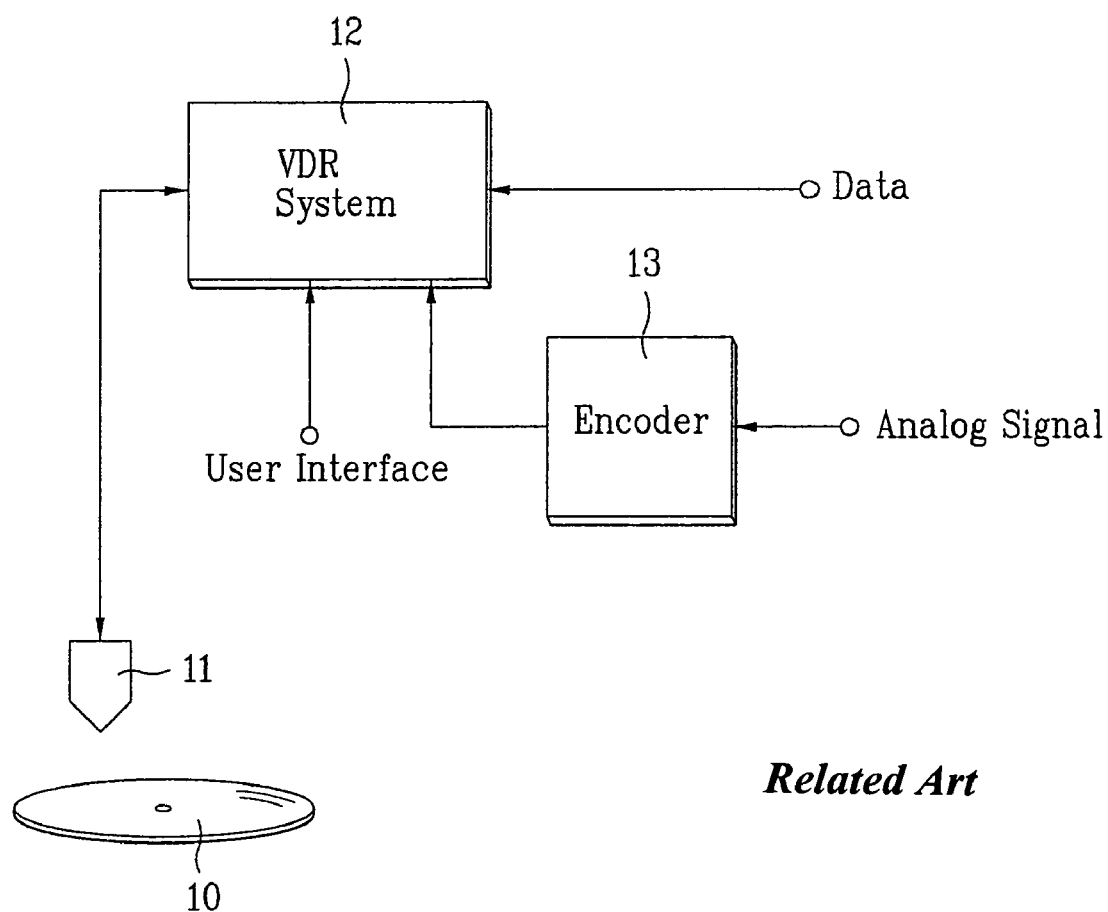
FIG. 1 is a schematic of an optical disc device of the related art.
Figure 2:
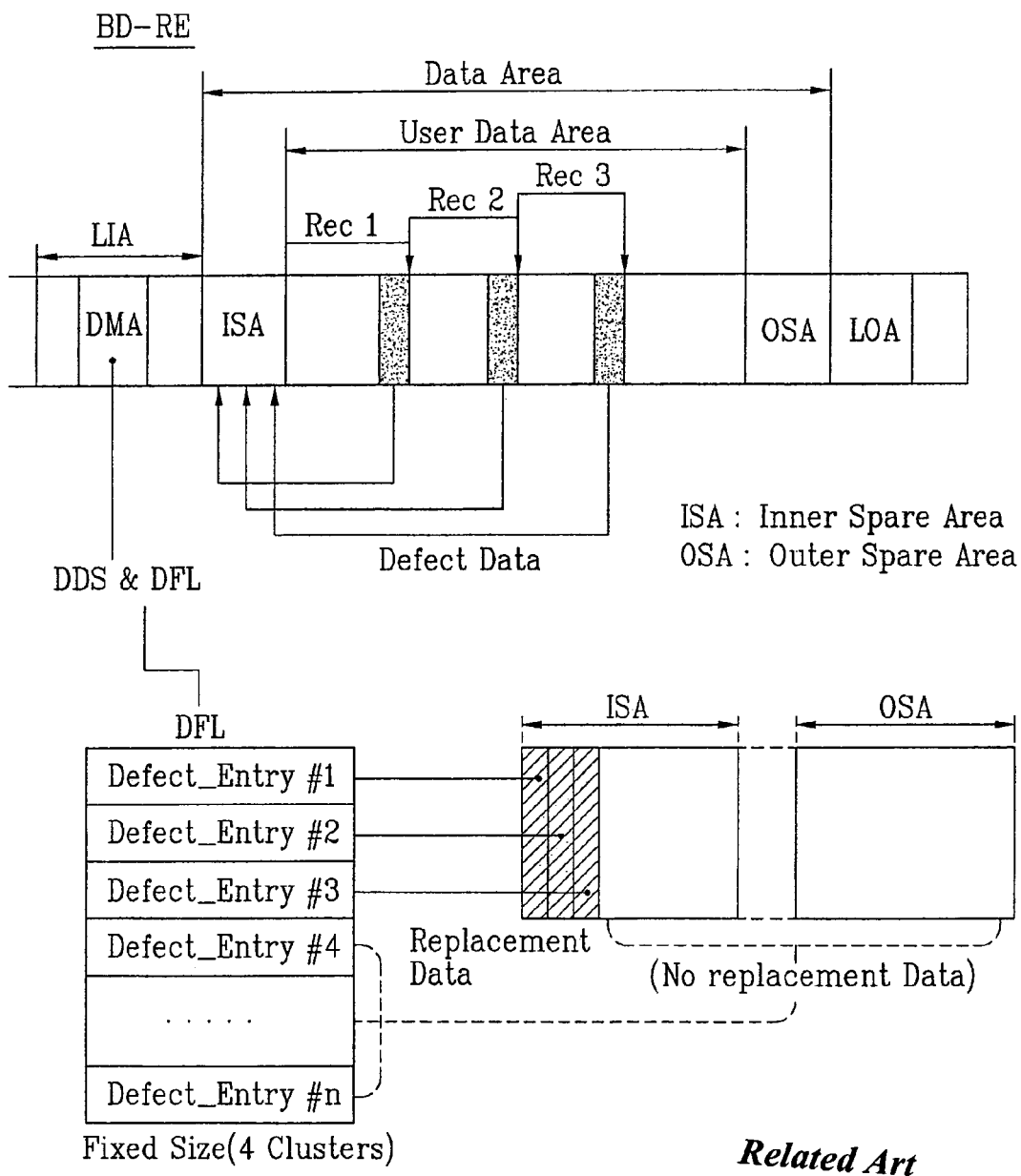
FIG. 2 is a block diagram of a method of the related art for managing a defective area on a BD-RE.

It should be noted that all the different embodiments of the present invention, e.g., various methods discussed hereinafter, are applicable to any type of an optical disc, such as a single layer BD-WO, a dual layer BD-WO or a BD-RE. Further, although the use of the recording/reproducing device 20 of FIG. 3 is discussed below in conjunction with the methods of the invention, the invention is not limited to such and encompasses other recording/reproducing devices as long as they are configured to implement the present methods. For instance, the device shown in FIG. 1 may be used to implement the present methods as needed.

Figure 5:
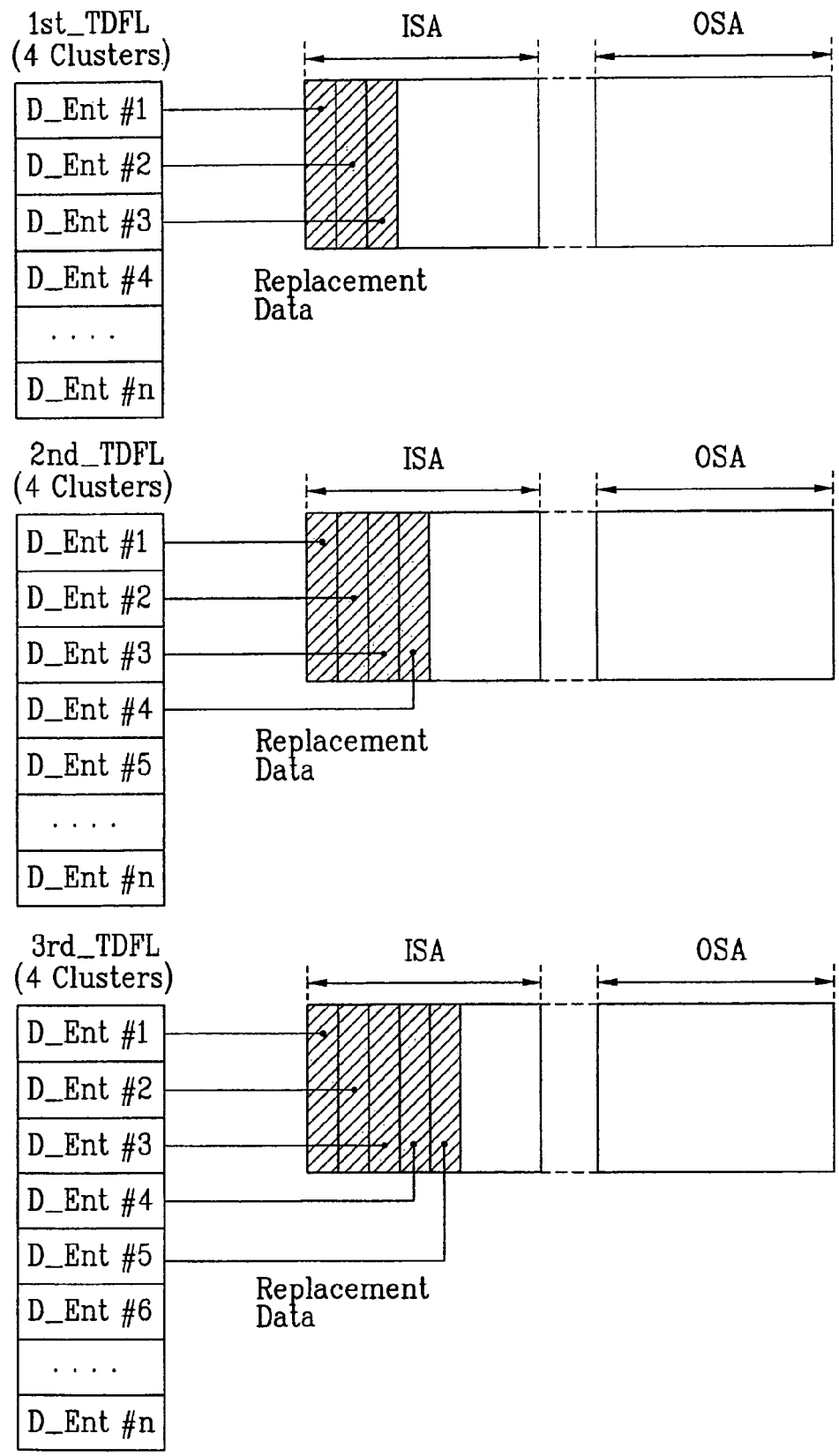
FIG. 5 is a block diagram of a method for managing a defective area on a BD-WO in accordance with an embodiment of the present invention.

FIG. 5 is a block diagram of a method for managing a defective area on a BD-WO in accordance with an embodiment of the present invention. In this method, a defective area on a BD-WO is managed in a manner similar to the methods utilized for BD-RE, in which a new Temporary DFL (TDFL) having a fixed recording size of four clusters is defined for application to the BD-WO. In the exemplary method for managing a defective area shown in FIG. 5, first to third defect entries D_Ent #1~#3 produced during a process of replacement writing in the middle of a first data writing operation are written and managed as first temporary defect list (1st_TDFL) information of four clusters.

Next, a fourth entry D_Ent #4 produced during a process of replacement writing in the middle of a second data writing operation is added, so as to write and manage first to fourth defect entries D_Ent #1~#4 as second temporary defect list (2nd_TDFL) information of four clusters. In addition, a fifth entry D_Ent #5 produced during a process of replacement writing in the middle of a third data writing operation is added, so as to write and manage first to fifth defect entries D_Ent #1~#5 as third temporary defect list (3rd_TDFL) information of four clusters.

However, if the foregoing operations are carried out repeatedly, there may be a problem in that a data recording capacity of the BD-WO is wasted or otherwise used inefficiently since the TDFL information with a four cluster fixed recording size is written and rewritten many times.

That is, in a case of the BD-RE, use of the defect list information with a four cluster fixed recording size does not matter because prior defect list information can be renewed as the BD-RE is re-writable. However, in a case of the BD-WO, a data recording capacity of the BD-WO is wasted or used inefficiently because a prior defect list cannot be renewed in the non re-writable (write once) BD-WO and therefore requires writing new temporary defect list information. Therefore, the present inventors have determined that the prior defect list information cannot be efficiently renewed in this format in this type of system.

Figure 6:
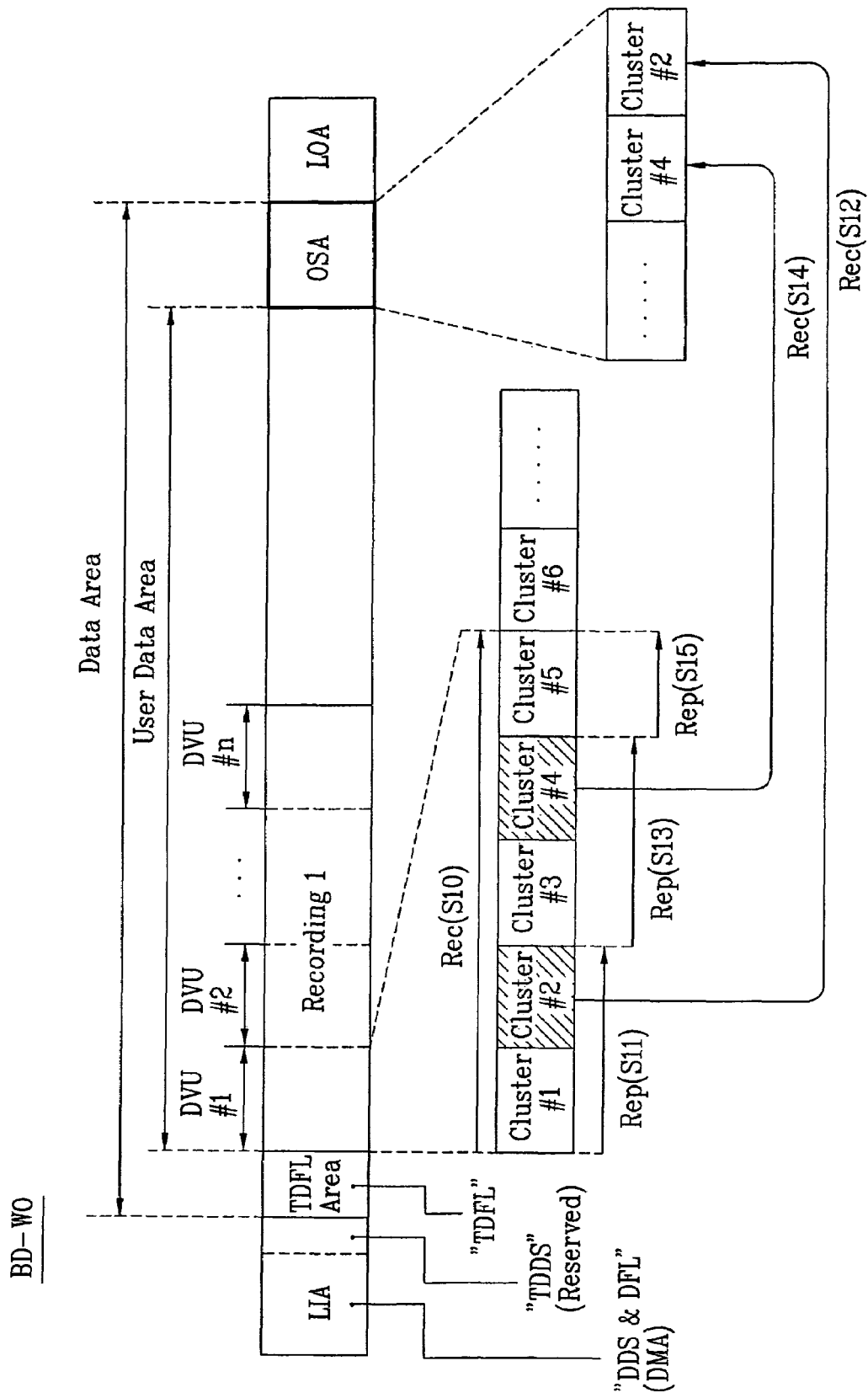
FIG. 6 is a block diagram of a method for managing a defective area on a BD-WO in accordance with a preferred embodiment of the present invention.

FIG. 6 is another block diagram of a method for managing a defective area on a BD-WO in accordance with a preferred embodiment of the present invention. As seen in FIG. 6, an exemplary BD-WO includes a lead-in area (LIA), a data area, and a lead-out area (LOA). The data area also includes a user data area with Physical Sector Numbers (PSN) and Logical Sector Numbers (LSN) provided together, and non-user data areas each only having physical sector numbers given thereto.

The non-user data area includes a spare area, e.g., an outer spare area (OSA) for writing data in place of a defective area, and a Temporary Defect List Area (TDFL Area) for writing management information on the defective area and the data written on the spare area. The OSA may be assigned to an ISA, or the ISA may be provided additionally in both locations. Similarly, the TDFL area may be assigned to a position adjacent to the OSA, or provided additionally in both locations.

The optical disc recording/reproducing device 20 of the optical disc device described with reference to FIG. 3 writes data continuously on a predetermined writing sector in the user data area when writing data. The predetermined data writing sector may be set as a Defect Verify Unit (DVU) of a recording size equivalent to one, or more than one, physical track or cluster for detecting the defective area during data writing.

After writing the data on the DVU, the optical disc recording/reproducing device 20 then repeats a series of defective area detecting operations in which the optical disc recording/reproducing device 20 reproduces the data written in the DVU, and verifies the data being written regularly. For example, after writing a first to a fifth cluster (clusters #1~#5) continuously as a first defect verify unit DVU #1 (S10), the optical disc recording/reproducing device 20 reproduces the data progressively written on the DVU #1, and detects any defective area.

For example, and as shown in FIG. 6, if a defective area is detected in the cluster #2 (S11), the data in the cluster #2 stored in the memory 27 or other storage of the optical disc recording/reproducing device 20 is temporarily written on the OSA in place of the defective area (S12).

In this instance, the cluster #2 may be written on the OSA starting from either the rear end or the fore end thereof. The optical disc recording/reproducing device 20 reproduces the data written on the DVU #1 starting from the cluster #3 after the writing operation. For example, and as shown in FIG. 6, if there is a defective area in the cluster #4 (S13), the data in the cluster #4 stored in the memory 27 or other storage of the optical disc recording/reproducing device 20 is temporarily written on the OSA in place of the defective area (S14).

Therefore, the DVU #1 will eventually have clusters #1, #3, and #5 written thereon regularly, and two defective areas. In contrast, the OSA has cluster #2 and #4 written thereon in place of the respective defective areas.

When a data recording having a temporary continuity (recording 1) ends while above defective area detection and replacement writing operation is continued in the DVU #1, DVU #2, . . . DVU #n, the optical disc recording/reproducing device 20 writes, in the TDFL area, management information as TDFL information for managing the defective areas and the data written in place of the defective areas.

Figure 7:
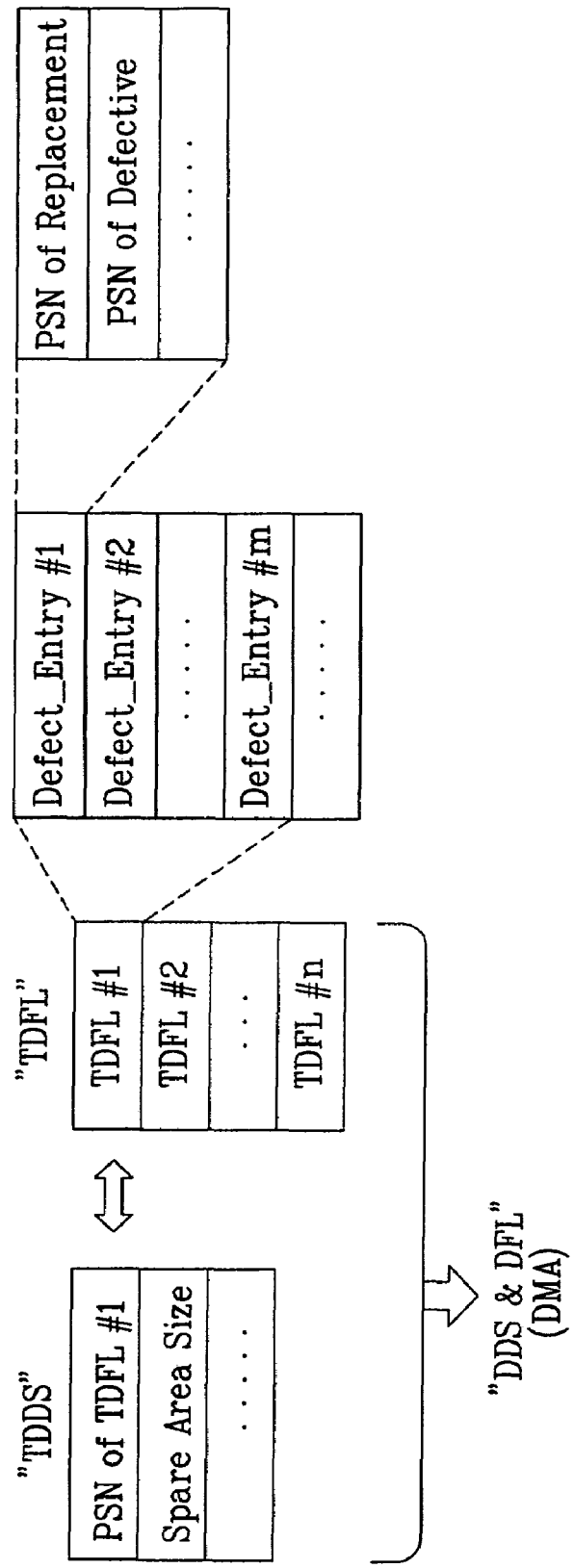
FIG. 7 is a block diagram of a method for managing a defective area on a BD-WO in accordance with a preferred embodiment of the present invention.

In this instance, the management information can be written and managed as a TDFL in one example. As shown in FIG. 7, the TDFL may include a plurality of defect entries Defect_Entry #1 . . . #m, each having a first physical sector number of the defective area (PSN of Defective), a first physical sector number of a data area where the replacement data for the defective area is written (PSN of Replacement), and a cross-reference to one another. The TDFL info includes a first physical sector of each TDFL, e.g., PSN of TDFL #1, a spare area size and any other management information as needed. Both the TDDS information and the TDFL information are transferred and written in a defect management area (DMA) of the BD-WO as defect management area information when the BD-WO is to be finalized or at some designated time.

Figure 8:
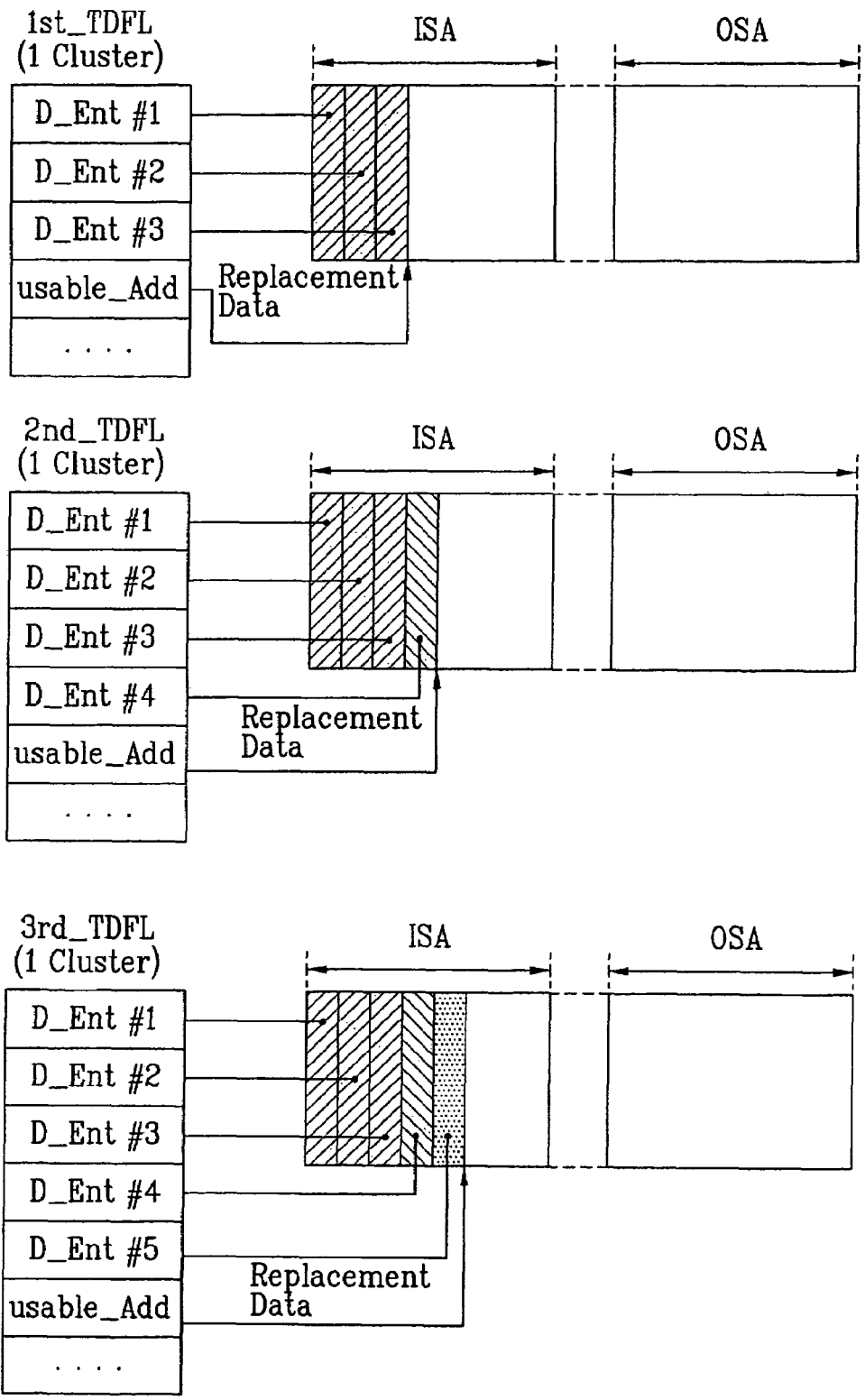
FIG. 8 is a block diagram of temporary defect list information written and managed according to a method for managing a defective area on a BD-WO in accordance with a preferred embodiment of the present invention.

The optical disc recording/reproducing device 20 writes in the TDFL area of the BD-WO and manages the temporary defect list information within a predetermined recording size of smaller than four clusters, e.g., such as one cluster recording size. For example, as shown in FIG. 8, the optical disc recording/reproducing device 20 writes in the TDFL area and manages the first to third defect entries D_Ent #1~#3 produced from a replacement writing process during a first data writing operation as first temporary defect list (1st_TDFL) information of one cluster. The first temporary defect list (1st_TDFL) information also includes writing location information (usable_Add) of the area of the spare area that is available for successive rewriting. For example, writing location information of the ISA having a possible, successive replacement writing location is included in the first temporary defect list (1st_TDFL). This writing location information serves as a navigation pointer directing the process of defect management to the appropriate locations of the data area.

The optical disc recording/reproducing device 20 then adds a fourth defect entry D_Ent #4 produced from a replacement writing process during a second data writing operation to form first to fourth entries D_Ent #1~#4. The optical disc recording/reproducing device 20 writes in the TDFL area and manages the first to fourth entries D_Ent #1~#4 as a second temporary defect list (2nd_TDFL) information of one cluster. The second temporary defect list (2nd_TDFL) information also includes new writing location information for the ISA successive replacement writing location if it is available.

The optical disc recording/reproducing device 20 then adds a new fifth defect entry D_Ent #5 produced from a replacement writing process during a third data writing operation to form first to fifth entries D_Ent #1~#5. The optical disc recording/reproducing device 20 then writes in the TDFL area and manages the first to fifth entries D_Ent #1~#5 as a third temporary defect list (3rd_TDFL) information of one cluster. The third temporary defect list (3rd_TDFL) information also includes new writing location information for the ISA successive replacement writing location if it is available.

Therefore, since the defect list information only includes defect entries for access to written replacement data actually written in the spare area, and writing location information for the spare area successive replacement writing locations if available, a recording size of the defect list information can be limited to one cluster. Accordingly, these navigation pointer(s) serve to reduce the required space for defect management information.

Figure 9:
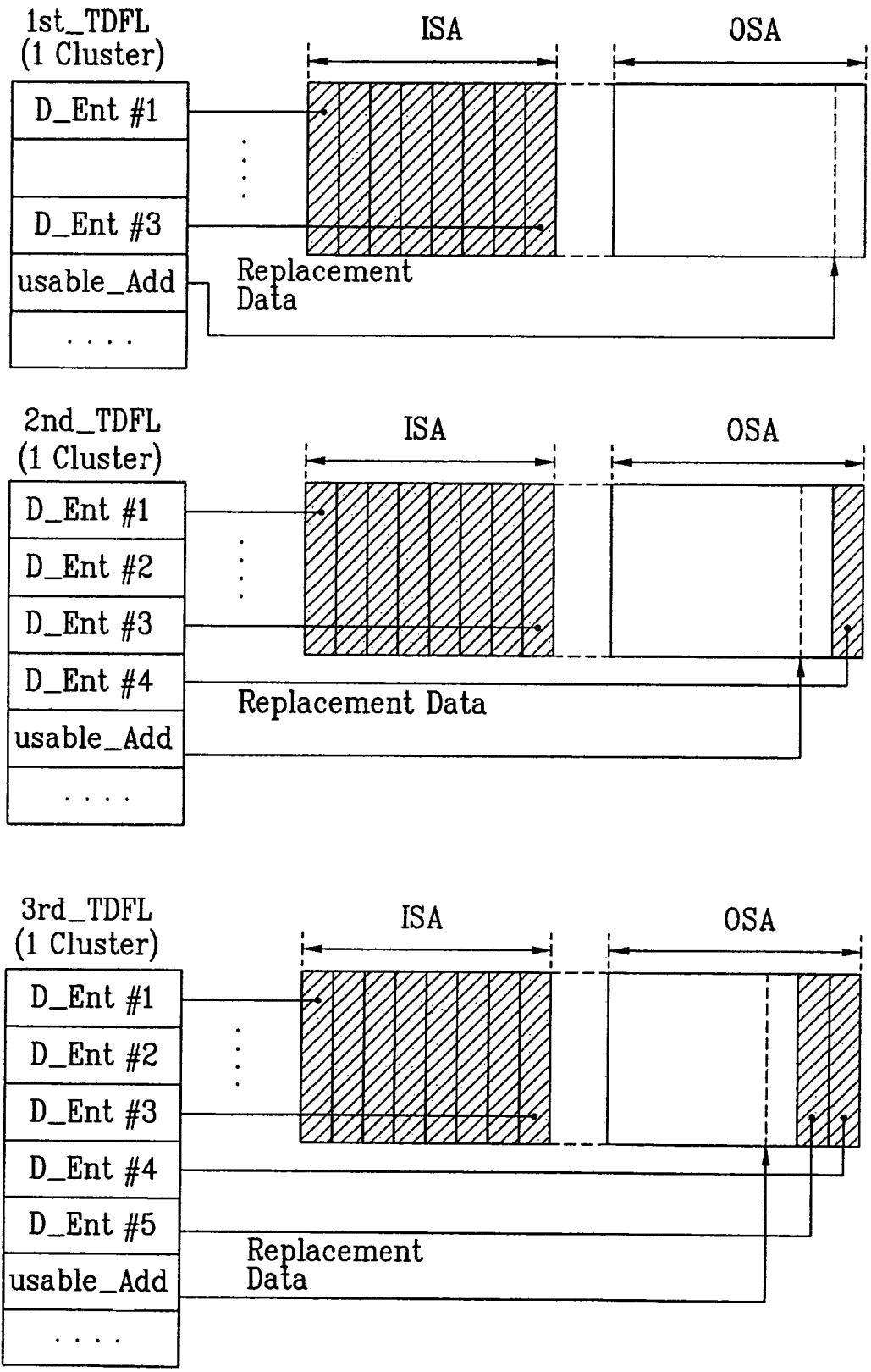
FIG. 9 is a block diagram of temporary defect list information written and managed according to a method for managing a defective area on a BD-WO in accordance with a preferred embodiment of the present invention.

FIG. 9 shows an example of writing defect management information on a BD-WO when one of the spare areas, e.g., an ISA, is full with replacement data. Referring to FIG. 9, the optical disc recording/reproducing device 20 writes writing location information (usable_Add) for successive replacement writing therein (if possible) on the defect list. The optical disc recording/reproducing device 20 writes replacement data in an opposite direction of the data replacement writing direction in the OSA in which the data is written, e.g., starting from an outer side to an inner side.

Figure 10:
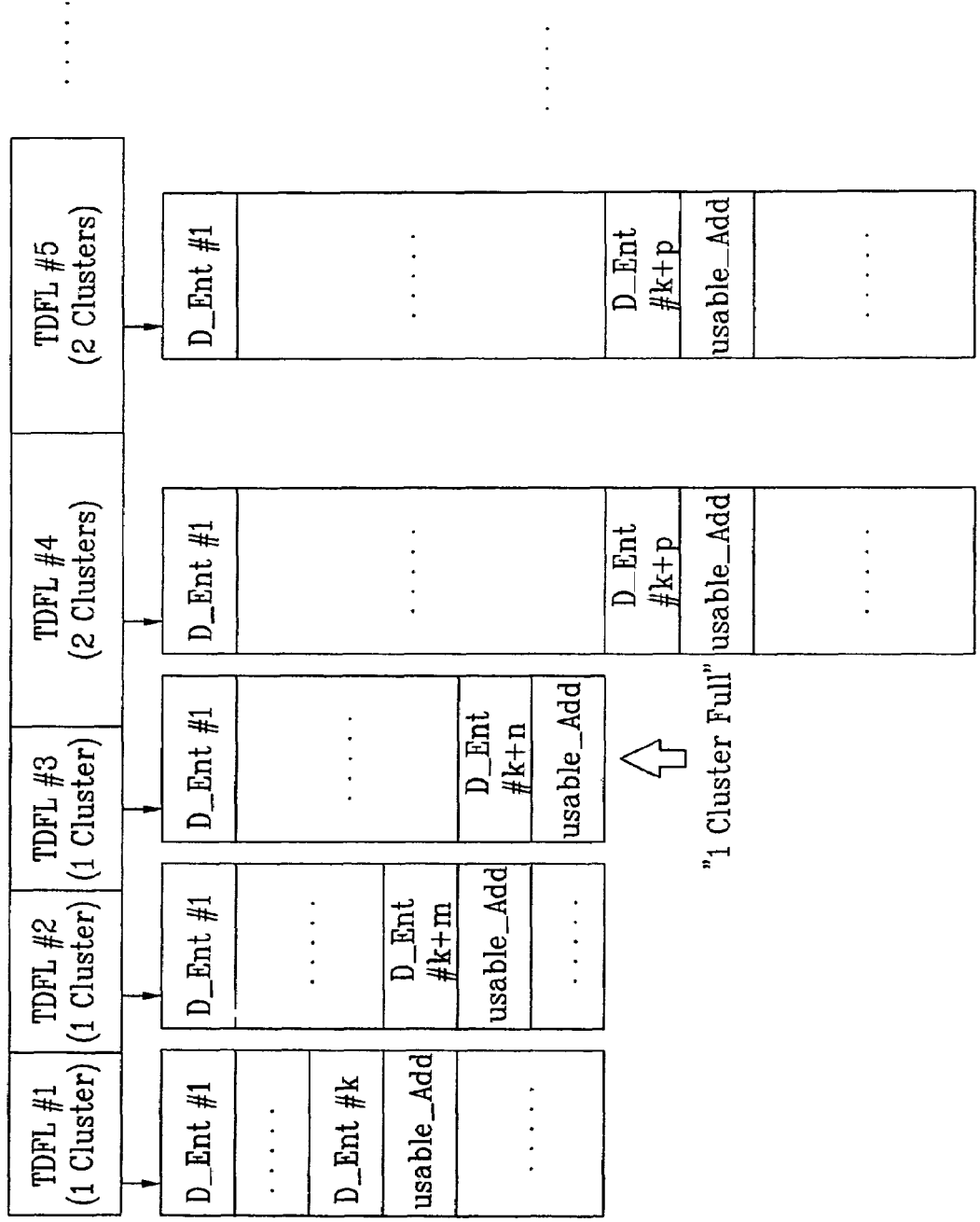
FIG. 10 is a block diagram of temporary defect list information written and managed according to a method for managing a defective area on a BD-WO in accordance with a preferred embodiment of the present invention.

Referring to FIG. 10, when the TDFL information to be newly written exceeds a recording size of one cluster due to an increase of the defect entries in the middle of production of the TDFL information of one cluster, the recording size of the TDFL newly produced is enlarged to two clusters from that time point forward according to a first embodiment of the present invention. For instance, when the third TDFL (TDFL #3) of one cluster size is full with the TDFL information written as discussed above, the allocated size of each subsequent TDFL is increased to, e.g., 2 clusters, to accommodate the increase in the TDFL information. In this manner, the allocated size of each TDFL may be increased further, as needed, e.g., from 2 to 4 clusters in recording size.

Figure 11:
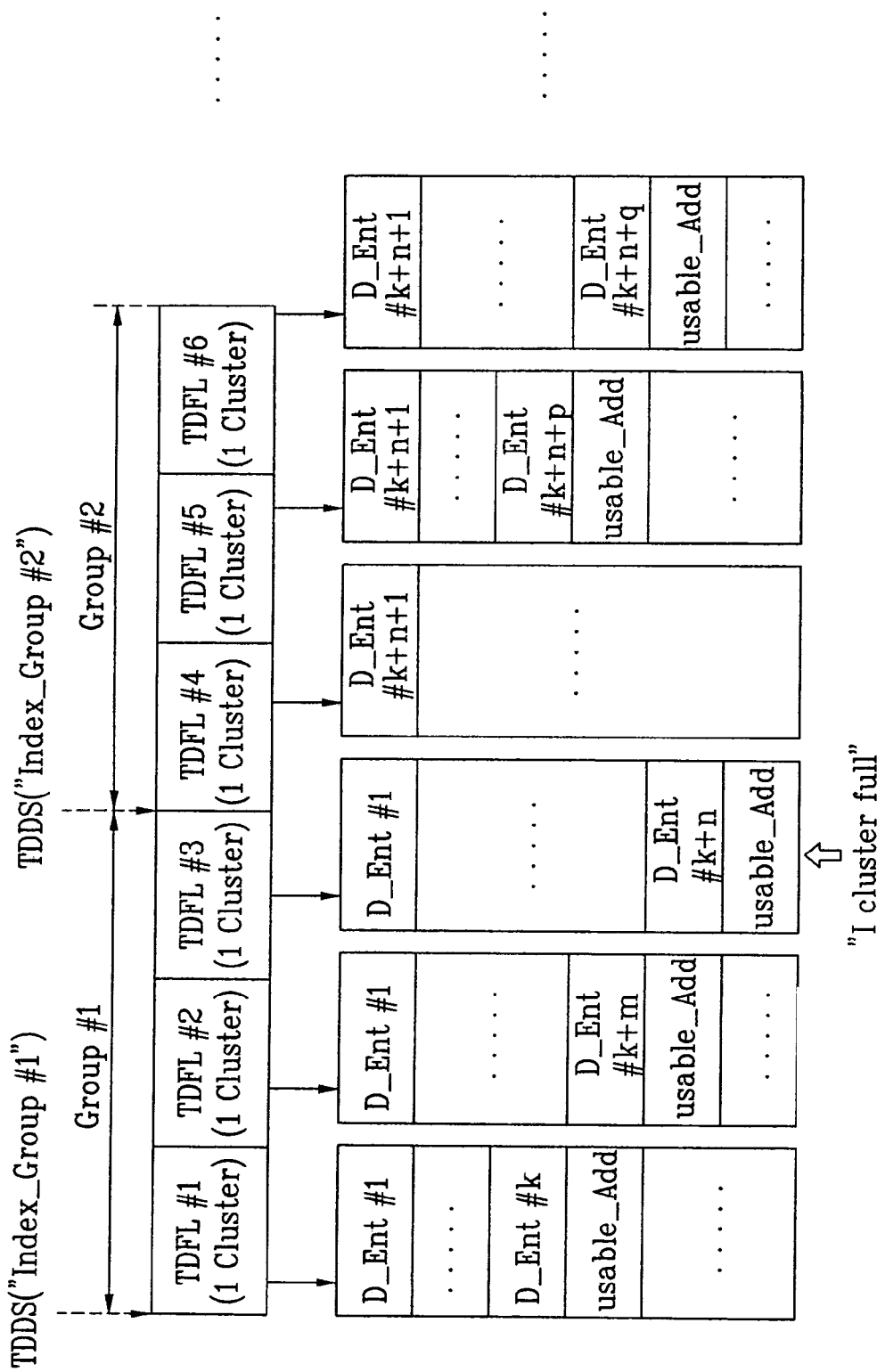
FIG. 11 is a block diagram of temporary defect list information written and managed according to a method for managing a defective area on a BD-WO in accordance with a preferred embodiment of the present invention.

As seen in a second embodiment shown in FIG. 11, when the TDFL information to be newly written exceeds the recording size of one cluster due to an increase of the defect entries in the middle of writing the TDFL information in the first cluster, a record of the defect entries previously written is omitted from the new TDFL information, e.g., in the fourth TDFL (TDFL #4). Simultaneously, while the new TDFL information is written in one cluster, new defect entries and writing location information of the spare area successive replacement writing locations (if possible) are written thereon. In this way, the size of each TDFL can be maintained at or under one cluster, as allocated.

The TDFL information having the new defect entries written thereon, and the TDFL information written previously are grouped as a first group (Group #1) and a second group (Group #2). Identification information for identifying the first group and the second group, e.g., the index group (Index_Group) information, is included with the TDDS information which is written in a designated TDDS area of the BD-WO, e.g., the TDDS area in the LIA shown in FIG. 6.

Accordingly, the optical disc device can carry out regular defect area management and replacement writing operation with reference to the defect entries in the TDFL information and writing location information of the successive spare area locations for replacement writing (if available). In addition, the optical disc device can write and manage the TDFL information in the smallest possible recording size.

It should be noted that the TDFL information can be written in any particular area on the recording medium, and transferred to a permanent defect management area (DMA) on the BD-WO as DFL information. In addition, the TDDS information can also be assigned to any particular area on the recording medium, and transferred to the DMA as DDS information.

The present invention for writing and managing the minimum defect entries and the writing location information for successive replacement writing locations (if possible) is applicable not only to the BD-WO described hereinabove and shown in the accompanying figures, but also a variety of other recording media, e.g., such as BD-RW.

Figure 12:
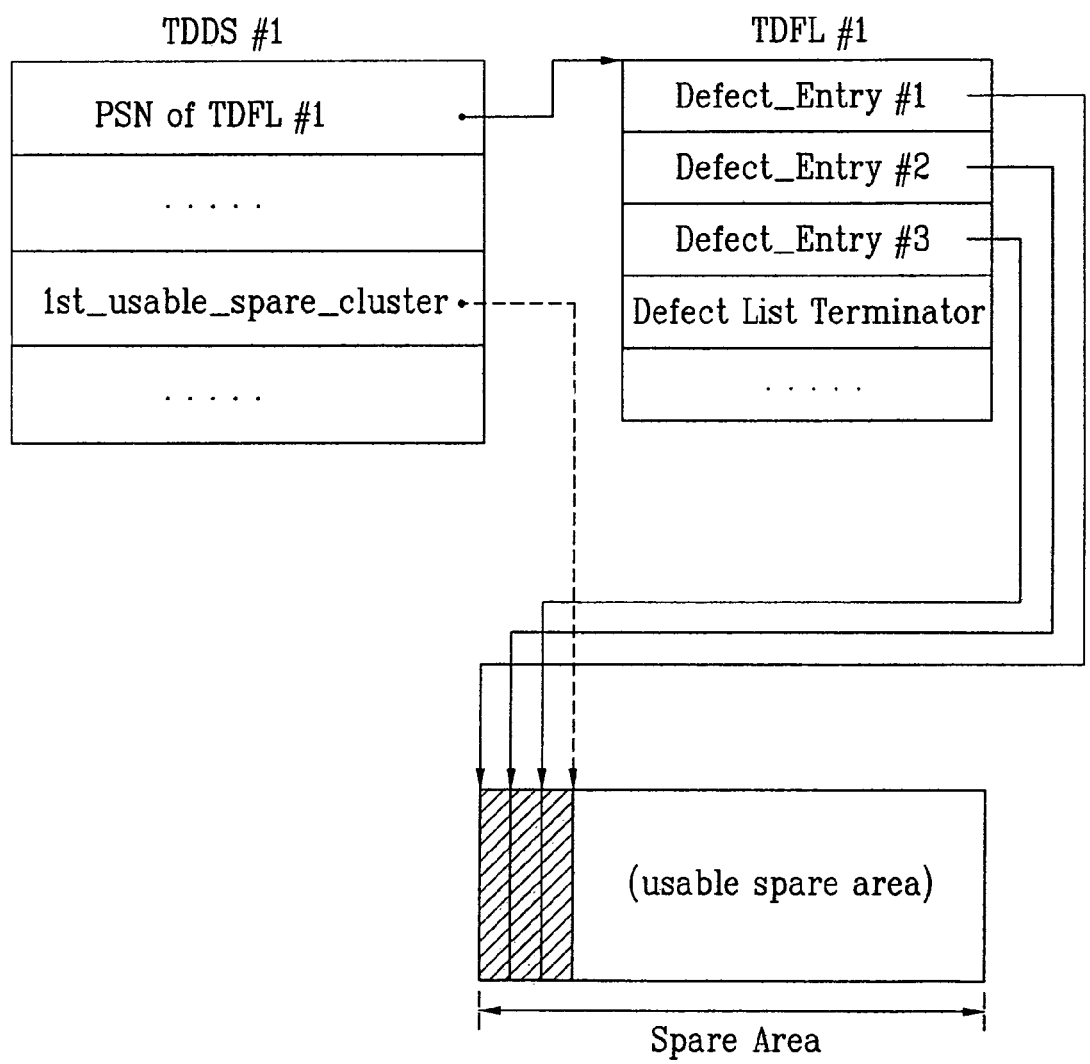
FIG. 12 is a block diagram showing defect definition structure information written and managed according to a method for managing a defective area on a BD-WO in accordance with a preferred embodiment of the present invention.

As seen in another embodiment of the present invention shown in FIG. 12, the minimum defect entries, and the identification information for indicating the end or termination of writing of the defect entries, e.g., such as defect list terminator (Defect List Terminator) information of 8 byte recording size, are written and managed in the first TDFL (TDFL #1). The writing location information of the successive replacement writing locations in the spare area (if available) is written and managed in the first TDDS (TDDS #1) information corresponding to the first TDFL information.

Further, for example, in the exemplary spare area of a BD-WO shown, the writing location information (1st_usable_spare_cluster) corresponding to a first sector of the first successive cluster available for replacement writing and the first physical sector number (the PSN of the first sector) for access to the first TDFL information (PSN of TDFL #1) are included in the first TDDS information.

Figure 13:
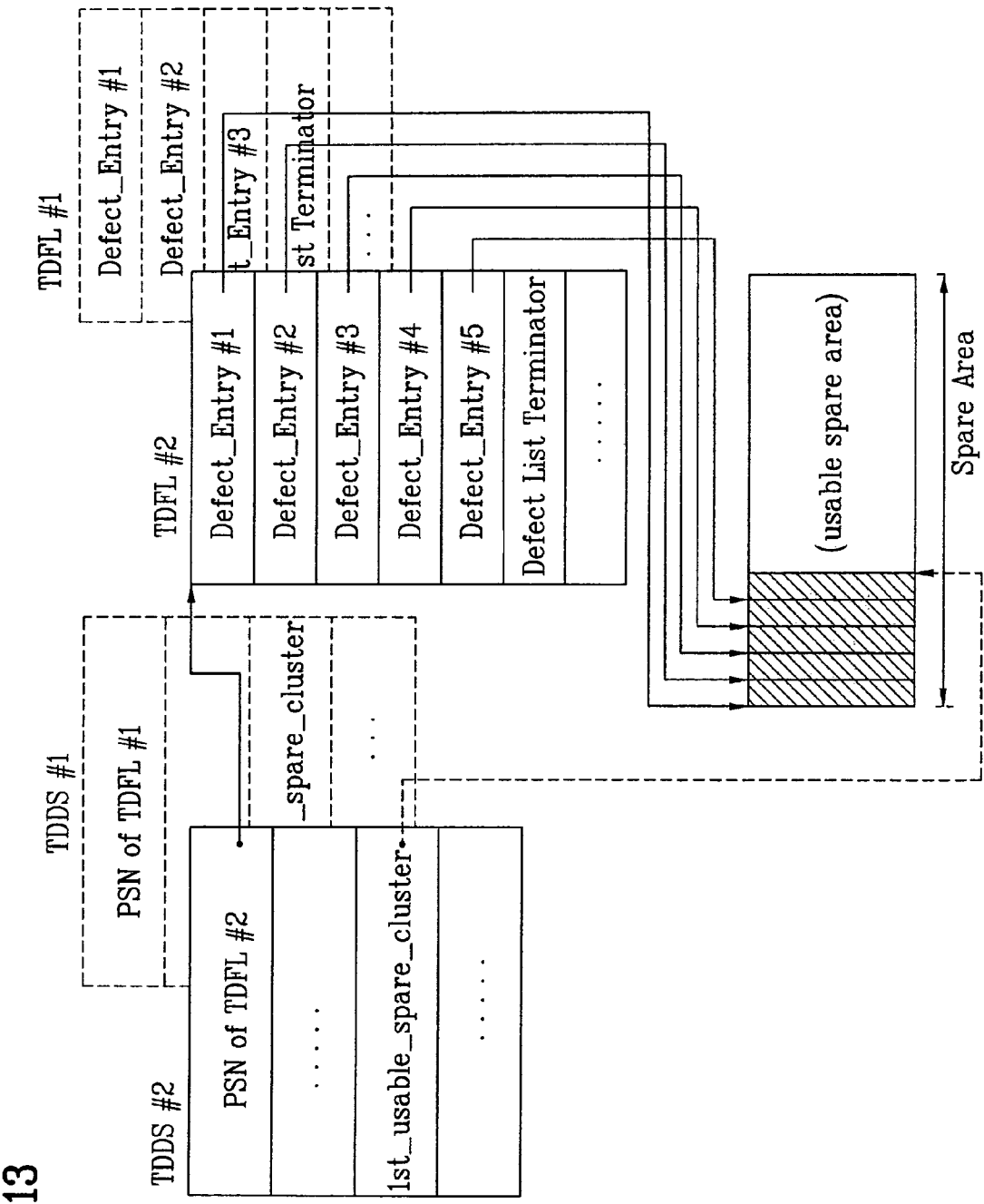
FIG. 13 is a block diagram showing defect definition structure information written and managed according to a method for managing a defective area on a BD-WO in accordance with a preferred embodiment of the present invention.

Also, as shown in FIG. 13, when the new second TDFL information (TDFL #2) is renewed, new defect entries, and defect list terminator information indicating the termination of the writing of the defect list are written in the second TDFL information (TDFL #2).

Also, the writing location information (1st_usable_spare_cluster) corresponding to a first sector of the first cluster of the spare area available for successive replacement writing and the first physical sector number for access to the second TDFL information (PSN of TDFL #2) are included in the second TDDS corresponding to the second TDFL information.

Accordingly, the TDDS information (TDDS #k) includes a physical sector number for access to the newly written TDFL information (PSN of TDFL #k) and writing location information (1st_usable_spare_cluster) corresponding to a first sector of the first cluster of the spare area available for successive replacement writing.

Figure 14:
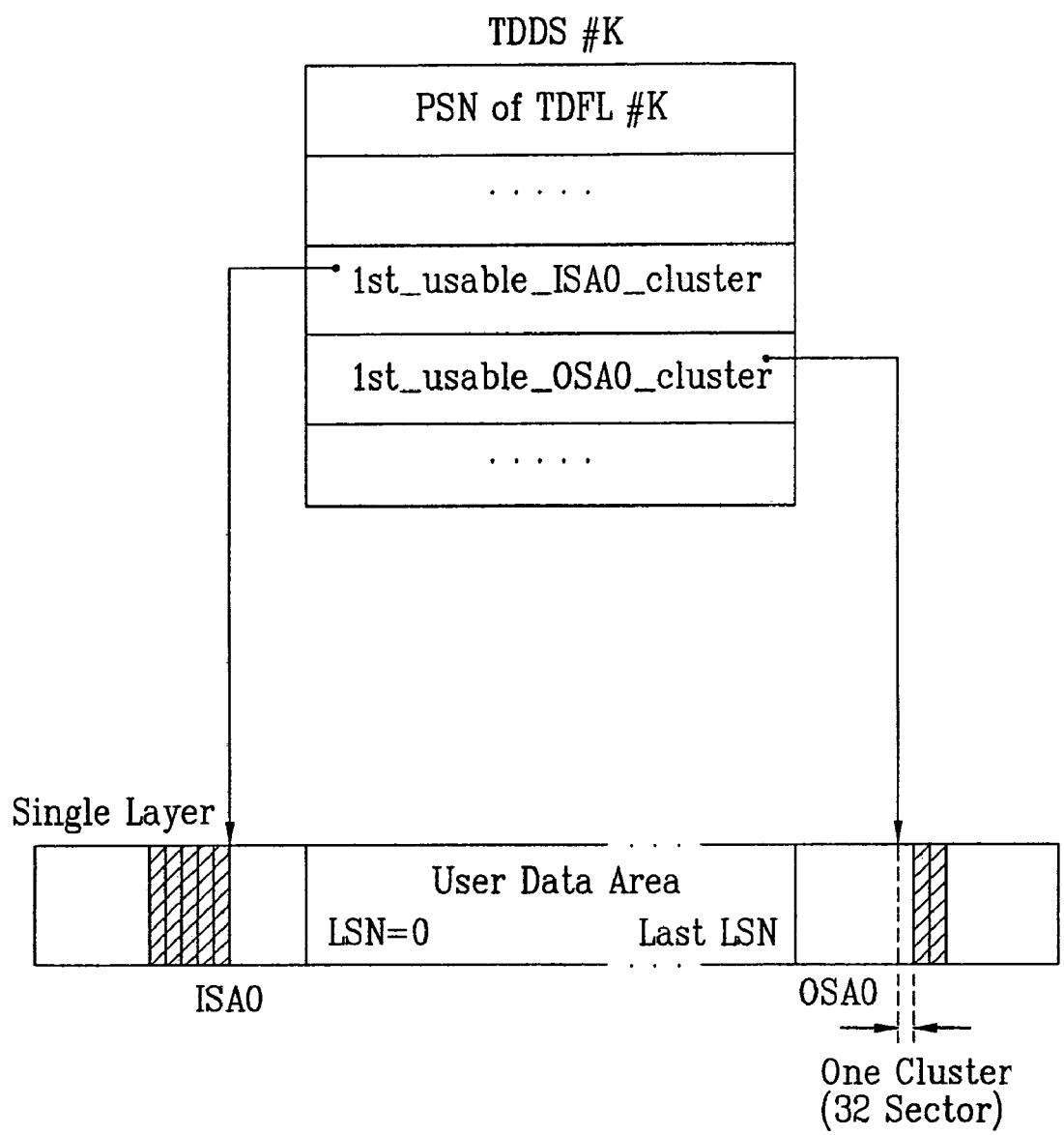
FIG. 14 is a block diagram showing defect definition structure information written and managed according to a method for managing a defective area on a single layer BD-WO in accordance with a preferred embodiment of the present invention.

Referring to FIG. 14, in the case of a BD-WO having a single layer and both the ISA and OSA, the TDDS (TDDS #k) includes writing location information (1st_usable_ISA0_cluster) corresponding to a first sector of the first cluster of the ISA available for successive replacement writing, and writing location information (1st_usable_OSA0_cluster) corresponding to a first sector of the first cluster of the OSA available for successive replacement writing.

As seen in FIG. 14, if the data replacement written in the OSA is written in a direction extending from an outer circumference toward an inner circumference of the optical disc, writing location information of a last sector of a cluster in front of the last data replacement written is written and managed as writing location information of the OSA available for successive replacement writing.

Figure 15:
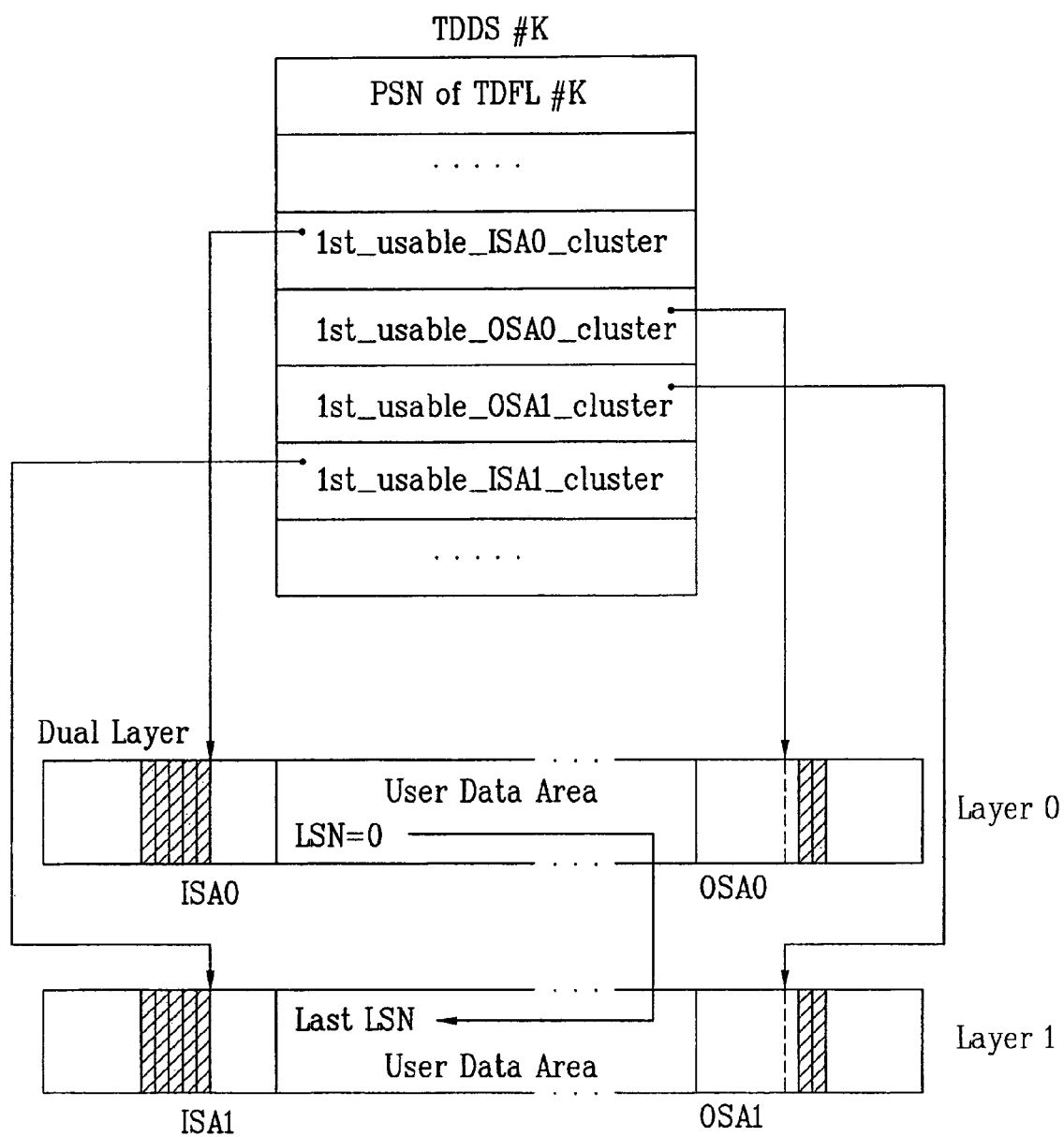
FIG. 15 is a block diagram showing defect definition structure information written and managed according to a method for managing a defective area on a dual layer BD-WO in accordance with a preferred embodiment of the present invention.

As seen in FIG. 15, in the case of a dual-layer BD-WO having inner spare areas (ISA0, and ISA1) and outer spare areas (OSA0, and OSA1) respectively assigned to the first layer (Layer 0) and a second layer (Layer 1), the TDDS information (TDDS #K) includes writing location information (1st_usable_ISA0_cluster, and 1st_usable_ISA1_cluster) corresponding to first sectors of the first clusters of the first and second inner spare areas available as successive replacement writing sectors, and writing location information (1st_usable_OSA0_cluster, and 1st_usable_OSA1_cluster) corresponding to first sectors of the first clusters of the first and second outer spare areas available as successive replacement writing sectors for defect management. These writing location information pieces can be written in the order shown or in different order.

Figure 16:
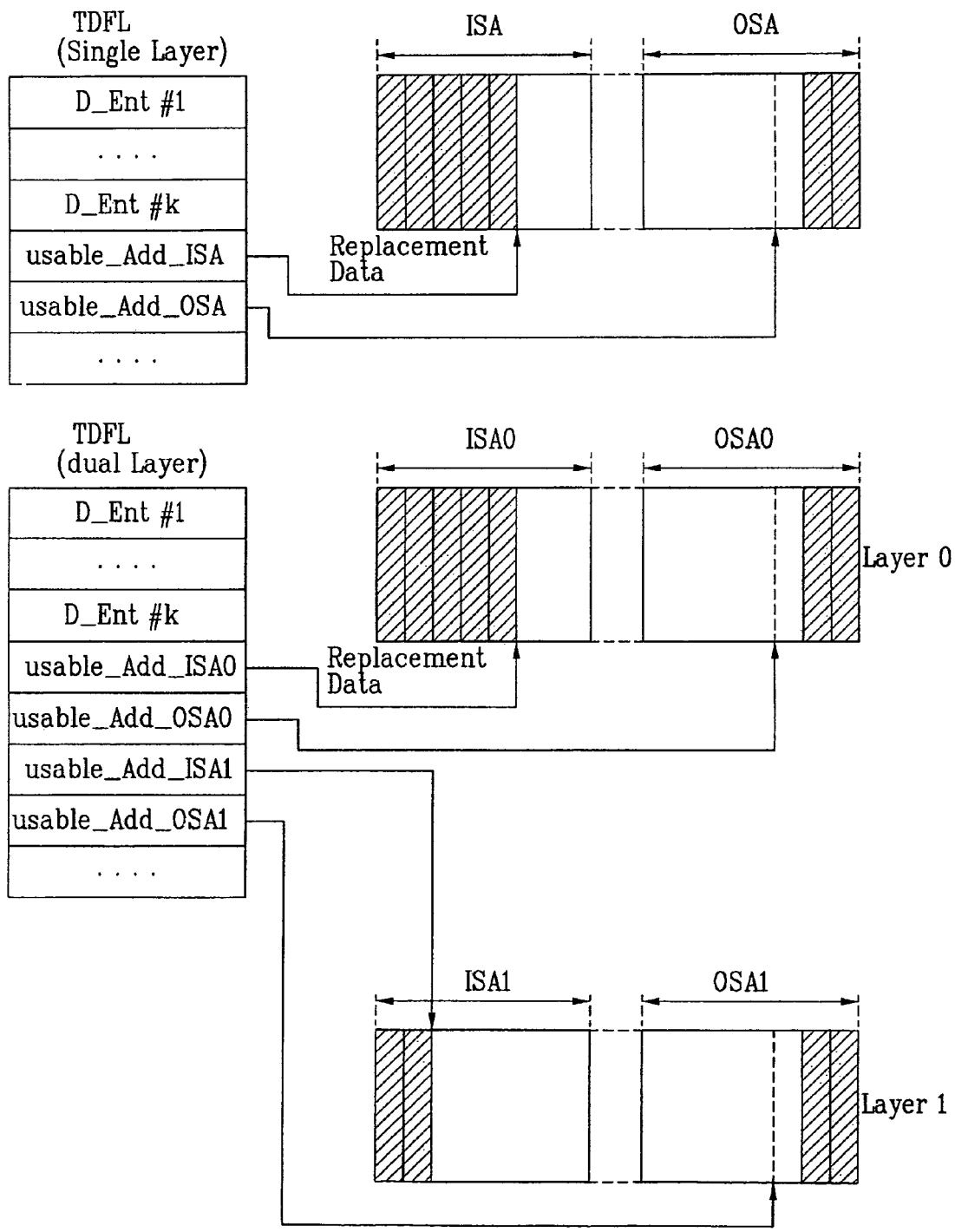
FIG. 16 is a block diagram showing temporary defect list information written and managed according to a method for managing a defective area on a single layer BD-WO and a dual layer BD-WO in accordance with another preferred embodiment of the present invention.

As seen in FIG. 16, even in the case where the writing location information (usable_Add) of the spare area available for successive replacement writing is written and managed in the TDFL information as described with reference to FIGS. 7-11, if the BD-WO has a single layer with the ISA and the OSA assigned thereto (as shown in FIG. 16), the TDFL information includes the writing location information (usable_Add_ISA) identifying a first sector of a first cluster of the ISA available for successive replacement writing and the writing location information (usable_Add_OSA) identifying a first sector of a first cluster of the OSA available for successive replacement writing for defect management.

Moreover, in the case a BD-WO having a dual layer with inner spare areas (ISA0, and ISA1) and outer spare areas (OSA0, and OSA1) respectively assigned to the first layer (Layer 0) and the second layer (Layer 1), the TDFL information includes writing location information (usable_Add_ISA0, and usable_Add_ISA1) identifying first sectors of the first clusters of the first and second inner spare areas available as successive replacement writing sectors, and writing location information (usable_Add_OSA0, and usable_Add_OSA1) identifying first sectors of the first clusters of the first and second outer spare areas available for successive replacement writing for defect management for both inner and outer layers, respectively. These writing location information pieces can be written in the order shown or in other order.

In another embodiment, the writing location information identifying the available sector in one or more spare areas can be written in the TDFL and the TDDS if desired.

Accordingly, the optical disc recording and reproducing device 20 can carry out regular defect area management and replacement writing operations with reference to the defect entries in the TDFL information and writing location information in the TDDS information and/or the TDFL information, and can write and manage the TDFL information in the smallest possible recording size of the spare areas.

As has been described, the method for managing a defective area on a high density optical disc of writable once type permits more efficient writing and management of defect list information or temporary defect list information for managing the defective area in a minimum recording size, by writing a data in a defective area existing on a high density optical disc, such as a BD-WO, in a spare area in place of the defective area, producing defect list information for access to the data replacement written in the spare area and writing in a particular area for management, wherein defect entries actually corresponding to the replacement written data, and writing location information of the spare area successive replacement writing thereon are written and managed as defect list information for management, or the writing location information of which replacement writing is possible is written and managed in defect definition structure information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for managing a recording medium having at least one temporary defect management area (TDMA), at least one defect management area (DMA) and at least one spare area, said method comprising:
    writing data associated with a defective area to the at least one spare area as replacement data if the defective area is detected within a data area of the recording medium; and
    writing defect management information in the at least one temporary defect management area for access to the data written in the at least one spare area, wherein said defect management information includes location information indicating a next available address of the at least one spare area,
    wherein the defect management information includes temporary defect list information and temporary disc structure information in the at least one temporary defect management area,
    the location information is written in the temporary disc structure information, and
    the temporary defect list information includes one or more defect entries and a defect list terminator following the one or more defect entries, and a defect entry is used to manage the defective area and the defect list terminator indicates a termination of the temporary defect list information.

2. The method according to claim 1, wherein the temporary defect list information has a recording size smaller than four clusters.

3. The method according to claim 1, wherein a recording size of the temporary defect list information to be written is varied to a recording size greater than one cluster when a number of defect entries exceeds one cluster of recording size.

4. The method according to claim 3, wherein the recording size of the temporary defect list information to be written is varied to a recording size greater than one cluster but smaller than four clusters.

5. The method according to claim 1, wherein the recording medium is a single layer Blu-ray disc of writable once type (BD-WO) having an inner spare area and an outer spare area assigned thereto, and the location information includes two pointers, the two pointers indicating next available addresses of the inner spare area and outer spare area, respectively.

6. The method according to claim 1, wherein the recording medium is a dual layer Blu-ray disc of writable once type (BD-WO) having an inner spare area and an outer spare area assigned to each of a first layer and a second layer respectively, and the location information includes four pointers, the four pointers indicating next available addresses of the inner spare area and outer spare area within the first layer and the second layer, respectively.

7. The method according to claim 1, wherein the location information points to a first sector of a next available cluster of the at least one spare area.

8. The method as claimed in claim 1, wherein the temporary disc structure information includes physical sector number information corresponding to a location of the temporary defect list information.

9. A recording medium comprising:
    a spare area within a data area, said spare area configured to store replacement data;
    a temporary defect management area configured to store defect management information to manage a defective area when the recording medium is under a non-finalized state; and
    a defect management area configured to store the defect management information to manage the defective area when the recording medium is under a finalized state,
    wherein data associated with the defective area is written in said at least one spare area as the replacement data; and
    wherein said defect management information includes location information indicating a next available address of the spare area,
    the defect management information further includes temporary defect list information and temporary disc structure information in the at least one temporary defect management area,
    the location information is written in the temporary disc structure information, and
    the temporary defect list information includes one or more defect entries and a defect list terminator following the one or more defect entries, and a defect entry is used to manage the defective area and the defect list terminator indicates a termination of the temporary defect list information.

10. The recording medium according to claim 9, wherein the recording medium is a single layer Blu-ray disc of writable once type (BD-WO) having an inner spare area and an outer spare area assigned thereto, and the location information includes two pointers, the two pointers indicating next available addresses of the inner spare area and outer spare area, respectively.

11. The recording medium according to claim 9, wherein the recording medium is a dual layer Blu-ray disc of writable once type (BD-WO) having an inner spare area and an outer spare area assigned to each of a first layer and a second layer respectively, and the location information includes four pointers, the four pointers indicating next available addresses of the inner spare area and outer spare area within the first layer and the second layer, respectively.

12. The recording medium according to claim 9, wherein the recording medium is a Blu-ray disc of writable once type (BD-WO).

13. The recording medium according to claim 9, wherein the location information points to a first sector of a next available cluster of the spare area.

14. The recording medium according to claim 9, wherein the temporary disc structure information includes physical sector number information corresponding to a location of the temporary defect list information.

15. An apparatus for managing a recording medium having at least one temporary defect management area (TDMA), at least one defect management area (DMA), and at least one spare area, said apparatus comprising:
    a pickup configured to read data from the recording medium and write data on the recording medium; and
    a controller, operatively coupled to the pickup, configured to control the pickup to write the data associated with a defective area to the at least one spare area as replacement data if the defective area is detected within a data area of the recording medium; and control the pickup to write defect management information in the at least one temporary defect management area for access to the data written in the at least one spare area, wherein said defect management information includes location information indicating a next available address of the at least one spare area, the defect management information includes temporary defect list information and temporary disc structure information in the at least one temporary defect management area, the location information is written in the temporary disc structure information, and the temporary defect list information includes one or more defect entries and a defect list terminator following the one or more defect entries, and a defect entry is used to manage the defective area and the defect list terminator indicates a termination of the temporary defect list information.

* * * * *